United States Patent

White

[15] 3,669,965

[45] June 13, 1972

[54] 1-LOWER ALKYL OR ALKYLENE SUBSTITUTED-6,7-METHYLENEDIOXY-4(1H)-OXOCINNOLINE-3-CARBOXYLIC ACIDS AND METHODS FOR MAKING AND USING SAME

[72] Inventor: William A. White, Fountaintown, Ind.

[73] Assignee: Eli Lilly and Company, Indianapolis, Ind.

[22] Filed: Dec. 29, 1969

[21] Appl. No.: 888,880

Related U. S. Application Data

[63] Continuation-in-part of Ser. No. 796,546, Feb. 4, 1969, abandoned.

[52] U.S. Cl. ....................260/250 A, 424/250, 260/340.5
[51] Int. Cl. ..............................................C07d 51/08
[58] Field of Search.................................260/250

[56] References Cited

OTHER PUBLICATIONS

Chemical Abstracts, Vol. 60, page 9,344– 9,345 (1964).
Chemical Abstracts, Vol. 69, page 3,365 (1968).

*Primary Examiner*—Nicholas S. Rizzo
*Attorney*—Everet F. Smith and Walter E. Buting

[57] ABSTRACT

1-Lower alkyl or alkenyl substituted-6,7-methylenedioxy-4(1H)-oxocinnoline-3-carboxylic acids, active against Gram-negative bacteria and Mycoplasma organisms and methods for the preparation and use thereof.

19 Claims, No Drawings

1-LOWER ALKYL OR ALKYLENE SUBSTITUTED-6,7-METHYLENEDIOXY-4(1H)-OXOCINNOLINE-3-CARBOXYLIC ACIDS AND METHODS FOR MAKING AND USING SAME

CROSS REFERENCE

This application is a continuation-in-part of my copending application, Ser. No. 796,546, filed February 4, 1969 now abandoned.

BACKGROUND OF THE INVENTION

Heretofore, a number of compounds have been used to combat microbial infections arising from Gram-negative bacteria and Mycoplasma organisms. Among such compounds are nalidixic acid and the substituted quinolines described in U.S. Pat. No. 3,287,458. None of the prior art compounds is effective against all strains of Gram-negative bacteria or Mycoplasma or a mixed combination of the two. Therefore, the search for more effective antimicrobials is a continuing one.

SUMMARY

New therapeutic compositions have now been discovered that are effective against a broad spectrum of microbial organisms. These new antimicrobial compositions comprise certain 1-lower alkyl or alkenyl substituted-6,7-methylenedioxy-4(1H)-oxocinnoline-3-carboxylic acids, prepared from 2'-nitro-4',5'-methylenedioxyacetophenone by a series of reactions involving hydrogenation to the 2'-amino compound, diazotization, and ring closure to the corresponding cinnoline-4-ol, bromination to the 3-bromocinnoline derivative, reaction with cuprous cyanide to prepare the 3-carbonitrile, introduction of a methyl, ethyl, n-propyl, isopropyl, n-butyl, or allyl group into the 1-position with simultaneous tautomerization of the hydroxyl at the 4-position to the (1H)-oxo, and hydrolysis of the carbonitrile group to a carboxylic acid group. A number of novel compounds are obtained as intermediates in this synthesis.

These new antimicrobial compounds can be employed in the form of the free acids or as nontoxic cationic salts of such acids for the prevention and treatment of microbial infections.

DESCRIPTION OF THE SPECIFIC EMBODIMENTS

The novel antimicrobial compounds of this invention are 1-lower alkyl or alkenyl substituted-6,7-methylenedioxy-4(1H)-oxocinnoline-3-carboxylic acids having the structure:

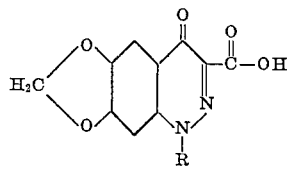

wherein R is a member of the group consisting of methyl, ethyl, n-propyl, isopropyl, n-butyl, vinyl and allyl.

The term "lower alkyl or alkenyl" as used herein means methyl, ethyl, n-propyl, isopropyl, n-butyl, vinyl and allyl.

The novel compounds of the present invention can be prepared by a multi-step synthesis starting with the known compound, 2'-nitro-4',5'-methylenedioxy-acetophenone. The foregoing starting material is reduced, utilizing platinum dioxide as a catalyst, in a Parr hydrogenation shaker at about 50 psi at a temperature of about 30°–40° C. to form the new compound, 2'-amino-4',5'-methylenedioxyacetophenone. Those skilled in the art will recognize that other catalysts, such as palladium on carbon, or Raney Nickel, can also be employed at pressures and temperatures other than those specified; or that the reduction can also be effected by using a suitable chemical reduction process.

The second step of the reaction sequence comprises diazotizing and ring closing the amino compound to a cinnoline derivative by diazotizing the aminoacetophenone with an equimolar amount of a nitrous acid-generating nitrite in the presence of a five- to ten-fold molar excess of a solution of hydrochloric acid at a temperature of 0° C. or below, then ring closing over a period of 3–24 hours at a temperature of 0°–80° C., the preferred reaction conditions being 3–4 hours at 80° C. The reaction yields the known 6,7-methylenedioxycinnoline-4-ol [Schofield and Simpson, J. Chem. Soc., 519 (1945)] of the formula:

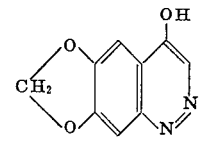

The cinnoline derivative can be brominated with bromine in the presence of an approximately equimolar amount of potassium acetate in a five- to ten-fold molar excess of acetic acid at the refluxing temperature of the reaction mixture. The resulting new compound, 3-bromo-6,7-methylenedioxycinnoline-4-ol, is converted to 6,7-methylenedioxycinnoline-4-ol-3-carbonitrile by treating the bromo derivative with from about an equimolar amount to about a twofold molar excess of cuprous cyanide. The reaction is generally conducted in a five- to 20-fold molar excess of dimethylformamide at atmospheric pressure for from 4–24 hours at a temperature of from about 50° C. to the refluxing temperature of the reaction mixture, preferably at refluxing temperatures of 4–6 hours.

Alkylation of 6,7-methylenedioxycinnoline-4-ol-3-carbonitrile with a methyl, ethyl, n-propyl, isopropyl, n-butyl or allyl bromide, chloride, iodide or sulfate can be effected in accordance with known procedures in a polar organic solvent such as a $C_1$ to $C_8$ alkanol, a $C_2$ to $C_4$ alkanediol, diethyleneglycol, triethyleneglycol, dimethylformamide, dimethylacetamide, N-methylpyrrolidone, and the like, in the presence of a basic reagent to produce the corresponding 1-methyl, ethyl, n-propyl, isopropyl, n-butyl, or alkyl-6,7-methylenedioxy-4(1H)-oxocinnoline-3-carbonitrile compounds of this invention.

The final step in the synthesis comprises hydrolysis of the carbonitrile to the corresponding carboxylic acid. The hydrolysis can be conveniently carried out with either an acid or a base. The preferred process comprises hydrolysis with concentrated hydrochloric acid in a reaction medium of acetic acid wherein the hydrochloric acid and the acetic acid are present in a molar ratio of from 1.4 to 4:1 and the concentration of the acetic acid relative to the nitrile is in a molar ratio of from 5:1 to 20:1.

1-Vinyl-6,7-methylenedioxy-4(1H)-oxocinnoline-3-carboxylic acid is prepared by alkylating 6,7-methylenedioxy-cinnoline-4-ol-3-carbonitrile with 1-bromo-2-hydroxyethane to form 1-(β-hydroxyethyl)-6,7-methylenedioxy-4(1H)-oxocinnoline-3-carbonitrile and hydrolyzing the alkylated carbonitrile to the corresponding carboxylic acid as described above. The 1-(β-hydroxyethyl)-6,7-methylenedioxy-4(1H)-oxocinnoline-3-carboxylic acid is then esterified using p-toluene-sulfonyl chloride in pyridine to form the tosylate. Elimination of the tosylate using a strong base, such as sodium ethoxide in anhydrous ethanol, yields the desired 1-vinyl-6,7-methylenedioxy-4(1H)-oxocinnoline-3-carboxylic acid. Other suitable methods for effecting the elimination of the elements of water from the β-hydroxyethyl substituent can also be employed. A variety of such methods are known in the art.

Also included within the scope of this invention are the salts of the above-described 1-lower alkyl or alkenyl substituted-6,7-methylenedioxy-4(1H)-oxocinnoline-3-carboxylic acids with the alkali metals such as lithium, sodium and potassium; the alkaline earth metals such as magnesium, calcium, strontium, and barium; and ammonium; and salts of amines having a pKa greater than 7.5 such as, for example, triethylamine, pyrrolidine, and the like. The salts can be formed by reacting the free acid with a suitable base, basic salt or amine such as sodium bicarbonate, calcium carbonate, ammonium hydroxide, triethylamine, and the like. Among the preferred salts are the sodium, potassium, calcium, and ammonium salts.

The 1-substituted-6,7-methylenedioxy-4(1H)-oxocinnoline-3-carboxylic acids and their salts are essentially white, high-melting crystalline solids. The free acids are soluble in most polar organic solvents, whereas the monovalent cationic salts are soluble in aqueous solvents.

This invention is further illustrated by the following examples:

EXAMPLE 1

Preparation of 2'-Amino-4',5'-Methylenedioxyacetophenone

About 90 gm. (0.43 mole) of 2'-nitro-4',5'-methylenedioxyacetophenone were suspended in about 300 ml. of absolute ethanol and 200 mg. of platinum dioxide were added. The mixture was placed in a Parr hydrogenation shaker and reduced with hydrogen at 50 psi at a temperature of 30°–40° C. for 3–4 hours until no further hydrogen uptake was observed. The solvent was evaporated from the reaction mixture under vacuum and the residue was taken up in 500 ml. of hot chloroform. The mixture was filtered and the filtrate was evaporated to dryness. The residue was recrystallized from an 80:20 mixture of ethanol and water to yield about 70 gm. of yellowish-brown crystals of 2'-amino-4',5'-methylenedioxyacetophenone having a melting point of about 167°–168° C. The yield was 90.7 percent.

Analysis: $C_9H_9NO_3$; Mol. Wt.: 179;
Calc.: C, 60.33; H, 5.06; N, 7.82;
Found: C, 60.60; H, 5.33; N, 7.75.

EXAMPLE 2

Preparation of 6,7-Methylenedioxycinnoline-4-ol

About 70 gm. (0.41 mole) of 2'-amino-4',5'-methylenedioxyacetophenone were added to 800 ml. of concentrated hydrochloric acid at room temperature. The resultant mixture was cooled to 0° C. and a solution of 35 gm. (0.5 mole) of sodium nitrite in 100 ml. of water was added dropwise while the temperature was maintained at 0° C. with stirring. Stirring was continued for 30 minutes after the sodium nitrite addition was completed. The resultant reaction mixture was filtered and the filtrate was warmed to 80° C. for 4 hours, allowed to cool to room temperature overnight to effect crystallization of the product, and filtered. The crystals so obtained were washed with water and then recrystallized from 600 ml. of an 80:20 mixture of dimethyl sulfoxide and water. About 65 gm. of 6,7-methylenedioxycinnoline-4-ol as light tan crystals were obtained. The product melted at about 338° C. with decomposition. The yield was 83.6 percent.

Analysis: $C_9H_6N_2O_3$; Mol. Wt.: 190;
Calc.: C, 56.84; H, 3,18; N, 14.73;
Found: C, 56.81; H, 2.93; N, 14.50.

EXAMPLE 3

Preparation of 3-Bromo-6,7-methylenedioxycinnoline-4-ol

About 60 gm. (0.3 mole) of 6,7-methylenedioxycinnoline-4-ol were added to a solution comprising 30 gm. (0.3 mole) of anhydrous potassium acetate in 400 ml. of acetic acid. The resultant mixture was heated to reflux and a solution comprising 48 gm. (0.3 mole) of bromine in 100 ml. of acetic acid was added dropwise over a 2-hour period with stirring. After the addition of the bromine was completed, the resultant reaction mixture was stirred for an additional 30 minutes under reflux. The reaction mixture was allowed to cool to room temperature and then poured into 1 liter of ice water. The resultant precipitate was recovered by filtration and washed with 300 ml. of a 5-percent sodium bicarbonate solution. Recrystallization from an 80:20 mixture of dimethyl sulfoxide and water afforded 76 gm. of tan crystals of 3-bromo-6,7-methylenedioxycinnoline-4-ol melting at 330° C. with decomposition. The yield was 94.3 percent.

Analysis: $C_9H_5BrN_2O_3$; Mol. Wt.: 269; Calc.: C, 40.17; H, 1.87; N, 10.41; Br, 29.70;
Found: C, 40.31; H, 1.85; N, 10.60; Br, 29.90.

EXAMPLE 4

Preparation of 6,7-Methylenedioxycinnoline-4-ol-3-carbonitrile

About 100 gm. (0.37 mole) of 3-bromo-6,7-methylenedioxy-cinnoline-4-ol were added to a slurry comprising 63 gm. (0.70 mole) of cuprous cyanide in 1,100 ml. of dry dimethylformamide. The resultant mixture was heated to reflux for 4–5 hours with stirring. Upon heating, the solution became homogenous. On completion of the reaction, a heavy green precipitate formed. The resultant reaction mixture was cooled to room temperature and poured into a solution comprising 160 gm. of ferric chloride, 120 ml. of concentrated hydrochloric acid, and 250 ml. of water. The resultant mixture was heated to 60° C. for 15–20 minutes, poured over 2 liters of cracked ice, and filtered. The yellow product was recrystallized from an 80:20 mixture of dimethyl sulfoxide and water yielding 75 gm. (93.8 percent) of 6,7-methylenedioxycinnoline-4-ol-3-carbonitrile as tan crystals which melted at 330°–340° C. with decomposition.

Analysis: $C_{10}H_5N_3O_3$; Mol. Wt.: 215;
Calc.: C, 55.82; H, 2.34; N, 19.53;
Found: C, 55.74; H, 3.04; N, 18.63.

EXAMPLE 5

Preparation of 1-Ethyl-6,7-Methylenedioxy-4(1H)-Oxocinnoline-3-Carbonitrile

About 70 gm. (0.36 mole) of 6,7-methylenedioxycinnoline-4-ol-3-carbonitrile were suspended in 500 ml. of dry dimethylformamide. About 18 gm. (0.36 mole) of dry sodium hydride (prepared by washing 50 percent sodium hydride in mineral oil with Skelly B solvent) were added to the above-mentioned slurry with stirring. The mixture became homogenous as hydrogen was evolved. After the cessation of hydrogen evolution, about 63 gm. (0.40 mole) of ethyl iodide were added dropwise at room temperature with stirring. Stirring was continued for 1 hour after the addition of the ethyl iodide was completed. The resultant reaction mixture was then heated to 100° C. for 2 hours, cooled to room temperature, and poured into 1 liter of ice water and made acidic with hydrochloric acid. The precipitate which was formed was removed by filtration and recrystallized from an 80:20 mixture of dimethyl sulfoxide and water. Fifty grams, a yield of 62.5 percent of 1-ethyl-6,7-methylenedioxy-4(1H)-oxocinnoline-3-carbonitrile as light tan crystals which melted at 268°–269° C. were recovered.

Analysis: $C_{12}H_9N_3O_3$; Mol. Wt.: 243.22;
Calc.: C, 59.26; H, 3.73; N, 17.28;
Found: C, 59.05; H, 3.74; N, 17.10.

By following the foregoing procedure and substituting for the ethyl iodide employed therein, a methyl, n-propyl, isopropyl, n-butyl, or allyl bromide, chloride, iodide or sulfate, the following compounds are obtained:

1-methyl-6,7-methylenedioxy-4(hH)-oxocinnoline-3-carbonitrile 1-n-propyl-6,7-methylenedioxy-4(1H)-oxocinnoline-3-carbonitrile 1-isopropyl-6,7-methylenedioxy-4(1H)-oxocinnoline-3-carbonitrile 1-n-butyl-6,7-methylenedioxy-4(1H)-oxocinnoline-3-carbonitrile 1-allyl-6,7-methylenedioxy-4(1H)-oxocinnoline-3-carbonitrile

EXAMPLE 6

Preparation of 1-Ethyl-6,7-Methylenedioxy-4(1H)-Oxocinnoline-3-Carboxylic acid

About 23 gm. (0.095 mole) of 1-ethyl-6,7-methylenedioxy-4(1H)-oxocinnoline-3-carbonitrile were added to a mixture of 200 ml. of concentrated hydrochloric acid and 200 ml. of acetic acid. The resultant reaction mixture was heated under reflux for 18 hours. The excess acids were removed under vacuum, and the residue was taken up in 150 ml. of a 5-percent sodium bicarbonate solution. The resultant solution was treated with 5 gm. of charcoal and filtered. The filtrate was made acidic by the addition of hydrochloric acid and the resulting precipitate was removed by filtration. Twenty-three grams, representing a yield of 91.6 percent, of 1-ethyl-6,7- methylenedioxy-4(1H)-oxocinnoline-3-carboxylic acid as light tan crystals which melted at 261°-262° C. with decomposition were recovered.

Analysis: $C_{12}H_{10}N_2O_5$; Mol. Wt.: 262;
Calc.: C, 54.96; H, 3.84; N, 10.68;
Found: C, 54.77; H, 3.84; N, 10.61.

By employing the foregoing hydrolysis procedure with the appropriate 1-substituted nitrile, the following compounds are obtained:

1-Methyl-6,7-methylenedioxy-4(1H)-oxocinnoline-3-carboxylic acid, m.p. 308° C. (d.)
  Analysis: Calc. for $C_{11}H_8N_2O_5$: C, 53.23; H, 3.29; N, 11.29;
  Found: C, 53.01; H, 3.27; N, 11.59.

1-n-Propyl-6,7-methylenedioxy-4(1H)-oxocinnoline-3-carboxylic acid, m.p. 229°-30° C.
  Analysis: Calc. for $C_{13}H_{12}N_2O_5$: C, 56.52; H, 4.38; N, 10.14;
  Found: C, 56.31; H, 4.45; N, 10.36.

1-Isopropyl-6,7-methylenedioxy-4(1H)-oxocinnoline-3-carboxylic acid, m.p. 304°-5° C. (d.)
  Analysis: Calc. for $C_{13}H_{12}N_2O_5$: C, 56.52; H, 4.38; H, 10.14;
  Found: C, 56.31; H, 4.29; N, 10.24.

1-Allyl-6,7-methylenedioxy-4(1H)-oxocinnoline-3-carboxylic acid, m.p. 214°-5° C.
  Analysis: Calc. for $C_{13}H_{10}N_2O_5$: C, 56.93; H, 3.68; N, 10.22;
  Found: C, 56.68; H, 3.86; N, 10.25.

1-n-Butyl-6,7-methylenedioxy-4(1H)-oxocinnoline-3-carboxylic acid, m.p. 210°-11° C.
  Analysis: Calc. for $C_{14}H_{14}N_2O_5$: C, 57.93; H, 4.86; N, 9.65;
  Found: C, 57.71; H, 4.98; N, 9.71.

The novel 1-lower alkyl or alkenyl substituted-6,7-methylene-dioxy-4(1H)-oxocinnoline-3-carboxylic acid compounds of this invention and their salts, possess outstanding antimicrobial activity. Included among the organisms, pathogenic to warm-blooded animals, against which substantial activity has been demonstrated in vitro are *Mycoplasma gallisepticum* and the Gram-negative bacteria *Escherichia coli*, *Salmonella dublin*, and *Vibrio coli*. These novel compounds have also been found to be active against the plant pathogens *Erwinia amylovora*, the causative agent of fire blight of applies and pears, *Xanthomonas phaseoli*, the causative agent of common bacterial blight of beans, and Aster yellows, a *Mycoplasma* disease.

Representative novel compounds of this invention (as their sodium salts) have the following minimum inhibitory concentrations (expressed as micrograms per milliliter) against the foregoing organisms in the conventional tube dilution test.

TABLE I.—IN VITRO ANTIMICROBIAL ACTIVITY

| Compound | Minimum inhibitory concentration, mcg. ml. when tested with— | | | |
|---|---|---|---|---|
| | E. coli | S. dublin | V. coli | M. galli septicum |
| 1-ethyl-6,7-methylenedioxy-4(1H)-oxocinnoline-3-carboxylic acid, sodium salt | 12.5 | 6.25 | 25.0 | 3.12 |
| 1-isopropyl-6,7-methylenedioxy-4(1H)-oxocinnoline-3-carboxylic acid, sodium salt | 25.0 | 12.5 | 50.0 | 25.0 |
| 1-allyl-6,7-methylenedioxy-4(1H)-oxocinnoline-3-carboxylic acid, sodium salt | 50.0 | 12.5 | 50.0 | 50.0 |

Also, the 1-lower alkyl or alkenyl substituted-6,7-methylenedioxy-4(1H)-oxocinnoline-3-carboxylic acids, and their salts, are effective therapeutic agents for microbial infections in warm-blooded animals. Moreover, they are effective by either parenteral or oral administration, as demonstrated by tests with young chicks. For example, the sodium salt of 1-ethyl-6,7-methylenedioxy-4(1H)-oxocinnoline-3-carboxylic acid was injected into the neck of day-old chicks at a level of approximately 50 mg. per chick. Two groups of five chicks each were so treated. Two groups of five chicks each were included as untreated controls. The four groups of five chicks each were immediately challenged with 0.1 ml. of a *Salmonella typhimurium* culture given intramuscularly. On the sixth day the number of survivors was determined for each group. The number of survivors indicated the activity of the compound against the test organism. The results of this test are compiled in Table II. The sodium salt was also administered by the oral route by incorporating 200 gm./ton thereof in chick feed fed continuously from the time of hatch. Four groups of nine chicks each were provided with the medicated feed. Four groups of nine chicks each were fed the same ration but without the active compound. The eight groups of nine chicks each were challenged by providing 50 ml. of a broth culture of *S. typhimurium* to each group of chicks instead of drinking water with consumption being complete within 24 hours. The number of survivors was determined on the tenth day. The oral activity of the compound against the test organism was indicated by the difference in the number of survivors between the treated and untreated groups. Table III shows the results of this test.

TABLE II

Antimicrobial Activity of 1Ethyl-6,7-methylenedioxy-4(1H)-oxocinnoline-3-carboxylic acid, Sodium Salt, Injected Subcutaneously into Day-Old Chicks

| Replicate | Treatment | | Survivors(6 days)/ No. Tested |
|---|---|---|---|
| 1 | 1-Ethyl-6,7-methylenedioxy-4-(1H)-oxocinnoline-3-carboxylic acid, sodium salt, 50 mg. | | 4/5 |
| 2 | " | | 3/5 |
| | | Totals | 7/10 |
| 1a | Infected controls | | 0/5 |
| 2a | " | | 0/5 |
| | | Totals | 0/10 |

TABLE III

Antimicrobial Activity of 1-Ethyl-6,7-methylenedioxy-4(1H)-oxocinnoline-3-carboxylic acid, Sodium Salt, Incorporated in the Feed of Newly Hatched Chicks

| Replicate | Treatment | | survivors(10 Days)/ No. Tested |
|---|---|---|---|
| 1 | 1-Ethyl-6,7-methylenedioxy-4-(1H)-oxocinnoline-3-carboxylic acid, sodium salt, 200 g./ton | | 6/9 |
| 2 | " | | 0/9 |
| 3 | " | | 8/9 |
| 4 | " | | 5/9 |
| | | Totals | 19/36 |
| 1a | Infected controls | | 0/9 |
| 2a | " | | 0/9 |
| 3a | " | | 3/9 |
| 4a | " | | 1/9 |
| | | Totals | 4/36 |

Furthermore, the injection of 1-ethyl-6,7-methylenedioxy-4(1H)-oxocinnoline-3-carboxylic acid, sodium salt, into the neck of 6-week-old broiler chickens, weighing about 600 gm., protected the treated chickens from challenge doses of *E. coli*. Ten groups of 10 chickens each were used in the test. Six of the 10 groups were injected subcutaneously with the active compound. The other four groups served as infected controls. Dosage levels of 50, 100, and 200 mg./kg. were employed. The air sac of each chicken was injected immediately after treatment with 0.5 ml. of a 10$^{-1}$ dilution of a 24-hour tryptose broth culture of an *E. coli* strain, one-half of the groups getting the Gross strain, the other half the Glantz strain. Seven days after treatment, the surviving chickens were sacrificed and autopsied. Each chicken was examined for air sac lesions, pericarditis, and perihepatitus. The mean lesion score for each group was determined by assigning the arbitrary scale to each chicken: 4 = death before autopsy; 3 = air sac lesion plus pericarditis plus perihepatitis; 2 = air sac lesion plus either pericarditis or perihepatitis; 1 = air sac lesion; 0 = no lesion. The total for the group was summed and divided by the number of chickens in the group. A mean lesion score of 4.0 signifies all chickens died before the end of the test, while a score of 0.0 means there were no deaths and no lesions were observed at necropsy. The difference in the magnitude of the mean lesion scores between the treated and untreated chickens indicates the activity of the compound against the test organism. Table IV lists the results of this test.

TABLE IV

Antiinfective Activity of 1-Ethyl-6,7-Methylenedioxy-4(1H)-oxocinnoline-3-carboxylic acid, Sodium Salt, Injected Subcutaneously into Six-Week-Old Chickens

| Treatment | No. of Chickens in Test | E. coli Strain | Mean Lesion Score |
| --- | --- | --- | --- |
| 1-Ethyl-6,7-methylenedioxy-4(1H) oxocinnoline-3-carboxylic acid, sodium salt, 50 mg./kg. | 10 | Gross | 0.9 |
| " | 10 | Glantz | 1.9 |
| 1-ethyl-6,7-methylenedioxy-4(1H)-oxocinnoline-3-carboxylic acid, sodium salt, 100 mg./kg. | 10 | Gross | 1.0 |
| " | 10 | Glantz | 0.6 |
| 1-Ethyl-6,7-methylenedioxy-4(1H)-oxocinnoline-3-carboxylic acid, sodium salt; 200 mg./kg. | 10 | Gross | 0.0 |
| " | 10 | Glantz | 0.5 |
| Infected controls | 10 | Gross | 1.7 |
| " | 10 | Gross | 2.6 |
| " | 10 | Glantz | 1.7 |
| " | 10 | Glantz | 2.3 |

The sodium salt of 1-ethyl-6,7-methylenedioxy-4(1H)-oxocinnoline-3-carboxylic acid was dissolved in water is a concentration of 1,000 p.p.m. and 0.0175 percent, weight/volume, of Toximul R and 0.0175 percent, weight/volume, of Toximul S (proprietary blends of non-ionic and anionic wetting agents supplied by Stepan Chemical Co., Northfield, Ill.) were added to the solution. The resulting solution was sprayed onto orchard-grown, 6-year-old Bartlett pear trees artificially inoculated with *Erwinia amylovora* (fire blight) until the leaves, branches, and trunk were wetted to the point of run-off. Expression of the symptoms of fire blight disease was arrested.

A stable liquid concentrate of 1-ethyl-6,7-methylenedioxy-4 (1H)-oxocinnoline-3-carboxylic acid, sodium salt can be prepared by dissolving from about 10 to about 50 percent weight/volume, of the active agent in deionized water and adding thereto from about 1 to about 10 percent, weight/volume, of a polyoxyethylene (10 mol.) alkyl phenol wetting agent. From about 1 to about 10 percent, weight/volume, of a salt of a lignin sulfonate is generally included in the formulation to serve as a chelating agent for heavy metal ions found in the water available as a diluent in many localities. A representative formula is comprised of:

| | |
| --- | --- |
| 1-ethyl-6,7-methylenedioxy-4(1H)-oxocinnoline-3-carboxylic acid, sodium salt | 480 grams |
| Triton X-100 [polyoxyethylene (10 mol.) octylphenol, wetting agent] | 100 grams |
| Polyfon H (sodium lignin sulfonate) | 100 grams |
| Deionized Water Q.S. | 1000 ml. |

The above-described formulation contains 4 lbs. of the active agent per gallon of concentrate; a popular concentration employed in agricultural chemicals formulations. This liquid concentrate is diluted with available water to a concentration of active ingredient appropriate for the intended use. For example, to make a spray solution containing about 1,000 p.p.m. of the active agent one quart of the above-described concentrate is added to about 120 gallons of water. The resulting solution is applied with a pressure sprayer at from about 20 to about 100 p.s.i. to the plants to be treated until all of the foliage and stems are wetted to the point of run-off.

The 1-lower alkyl or alpenyl substituted-6,7-methylenedioxy-4(1H)-oxocinnoline-3-carboxylic acids, and their salts, have a low level of mammalian toxicity. Thus, for example, no deaths are encountered when the sodium salt of 1-ethyl-6,7-methylenedioxy-4(1H)-oxocinnoline-3-carboxylic acid is administered at levels as high as 200 mg./kg. intraperitoneally or 500 mg./kg. orally to mice.

The novel compounds of this invention and their salts are effective in combating microbial infections in warm-blooded animals when administered in total daily amounts of from about 25 mg. to about 500 mg./kg. of body weight.

Because of their greater water solubility, chemical stability, substantial efficacy, ease of preparation, and amenability to incorporation in various pharmaceutical dosage forms and medicated feeds, the use of the alkali metal and ammonium salts of the 1-lower alkyl or alpenyl substituted-6,7-methylenedioxy-4(1H)-oxocinnoline carboxylic acids are preferred in the practice of this invention.

In a preferred embodiment of the present invention, 1-ethyl-6,7-methylenedioxy-4(1H)-oxocinnoline-3-carboxylic acid as a salt is administered orally in a suitable feed in which the compound is present in an amount of from about 25 to about 2,500 grams per ton of total feed, the exact concentration depending on the amount required to provide for the ingestion of an effective dosage of the active agent when normal amounts of feed are consumed. The addition of the compounds of this invention to feed is preferably accomplished by preparing an appropriate feed premix and incorporating the premix into the complete ration. Alternatively, an intermediate concentrate or feed supplement containing the compound can be blended into the feed.

The preparation of a suitable feed premix can be effected by grinding the compounds of this invention to a powder and admixing with a suitable carrier such as alfalfa grits, solvent-extracted soybean feed, corn meal, exfoliated hydrobiotite, and like carriers. The premix so prepared is then admixed with whatever feed ration is being fed to the animal at the time of administering the compounds of this invention. The feed premix can first be diluted with a feed supplement or feed concentrate to a desired concentration of the active compound, and the medicated supplement or concentrate can either be fed concurrently with the remainder of the ration or can be mixed into the final feed.

An alternative procedure for preparing the premix comprises dissolving the active compound in a suitable solvent such as water, or preparing a slurry of the compound in an appropriate vehicle such as an edible vegetable oil or an edible glycol, and adding such solution or slurry to the premix carrier by spraying onto the carrier with suitable mixing.

The 1-lower alkyl or alpenyl substituted-carboxylic acids and their salts can be administered as a single dose or in divided doses either in parenteral or oral dosage form. When a parenteral dosage form is indicated, the active agent can be dissolved in an aqueous vehicle in a concentration of from about 25 to about 200 mg./ml., the exact concentration being a function of the required effective dosage of the active agent and the volume of total solution that can be conveniently injected into the animal.

The novel compounds of this invention can also be administered orally in one of the customary oral dosage forms; for example, filled capsules, liquids, suspensions, compressed tablets, and the like. Such oral dosage forms customarily contain the desired amount of the active compound along with appropriate fillers, binders, solvents, vehicles, preservatives, and other excipients. Illustratively, 1-ethyl-6,7-methylenedioxy-4(1H)-oxocinnoline-3-carboxylic acid can be processed into tablets suitable for oral administration by the following procedure: 5.0 gm. of 1-ethyl-6,7-methylenedioxy-4(1H)-oxocinnoline-3-carboxylic acid are mixed with 22.0 gm. of lactose, 2.9 gm. of starch, and 0.1 gm. of magnesium stearate, and the mixture is pressed into tablets of such size that each tablet contains 50 mg. of the active agent.

What is claimed is:

1. A compound of the class consisting of compounds of the following formula:

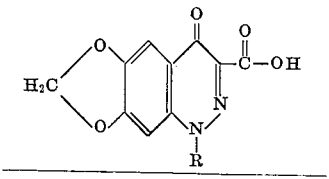

Wherein R is a member of the group consisting of methyl, ethyl, n-propyl, isopropyl, n-butyl, vinyl and allyl, and the cationic salts thereof formed with an alkali metal, or alkaline earth metal, ammonia, triethylamine, or pyrrolidine.

2. A compound according to claim 1 wherein the compound is 1-ethyl-6,7-methylenedioxy-4(1H)-oxocinnoline-3-carboxylic acid.

3. A compound according to claim 1 wherein the compound is 1-methyl-6,7-methylenedioxy-4(1H)-oxocinnoline-3-carboxylic acid.

4. A compound according to claim 1 wherein the compound is 1-vinyl-6,7-methylenedioxy-4(1H)-oxocinnoline-3-carboxylic acid.

5. A compound according to claim 1 wherein the compound is 1-(n-propyl)-6,7-methylenedioxy-4(1H)-oxocinnoline-3-carboxylic acid.

6. A compound according to claim 1 wherein the compound is 1-allyl-6,7-methylenedioxy-4(1H)-oxocinnoline-3-carboxylic acid.

7. A compound according to claim 1 wherein the compound is 1-isopropyl-6,7-methylenedioxy-4(1H)-oxocinnoline-3-carboxylic acid.

8. A compound according to claim 1 wherein the compound is 1-(n-butyl)-6,7-methylenedioxy-4(1H)-oxocinnoline-3-carboxylic acid.

9. A method for the preparation of a compound of the class of compounds of the following formula:

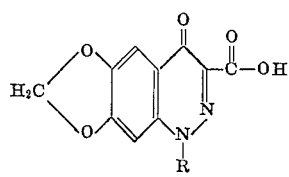

Wherein R is a member of the group consisting of methyl, ethyl, n-propyl, isopropyl, n-butyl and allyl which comprises:
 a. catalytically reducing 2'-nitro-4',5'-methylenedioxyacetophenone to 2'-amino-4',5'-methylenedioxyacetone.
 b. diazotizing 2'-amino-4',5'-methylenedioxyacetophenone with nitrous acid and cyclizing to yield 6,7-methylenedioxycinnoline-4-ol
 c. treating 6,7-methylenedioxycinnoline-4-ol with bromine to produce 3-bromo-6,7-methylene-dioxycinnoline-4-ol
 d. treating 3-bromo-6,7-methylenedioxycinnoline-4-ol with cuprous cyanide to form 6,7-methylenedioxy-cinnoline-4-ol-3-carbonitrile
 e. alkylating 6,7-methylenedioxycinnoline-4-ol-3-carbonitrile with an alkyl or alkylene bromide, chloride, iodide or sulfate to form a 1-lower alkyl or alkylene substituted-6,7-methylenedioxy-4(1H)-oxocinnoline-3-carbonitrile of the following formula:

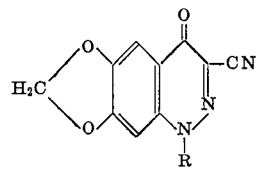

Wherein R is a member of the group consisting of methyl, ethyl, n-propyl, isopropyl, n-butyl and allyl and:
 f. hydrolyzing the 1-lower alkyl or alkylene substituted-6,7-methylenedioxy-4(1H)-oxocinnoline-3-carbonitrile 10. 3-Bromo-6,7-methylenedioxycinnoline-4-ol 11. 6,7-methylenedioxycinnoline-4-ol-3-carbonitrile 12. A compound of the class consisting of compounds of the following formula:

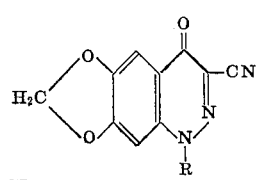

Wherein R is a member of the group consisting of methyl, ethyl, n-propyl, isoproply, n-butyl, β-hydroxyethyl and allyl.

13. A compound according to claim 12 wherein the compound is 1-methyl-6,7-methylenedioxy-4(1H)-oxocinnoline-3-carbonitrile.

14. A compound according to claim 12 wherein the compound is 1-ethyl-6,7-methylenedioxy-4(1H)-oxocinnoline-3-carbonitrile.

15. A compound according to claim 12 wherein the compound is 1-(n-propyl)-6,7-methylenedioxy-4(1H)-oxocinnoline-3-carbonitrile.

16. A compound according to claim 12 wherein the compound is 1-isopropyl-6,7-methylenedioxy-4(1H)-oxocinnoline-3-carbonitrile.

17. A compound according to claim 12 wherein the compound is 1-isopropyl-6,7-methylenedioxy-4(1H)-oxocinnoline-3-carbonitrile.

18. A compound according to claim 12 wherein the compound is 1-β-hydroxylethyl-6,7-methylenedioxy-4(1H)-oxocinnoline-3-carbonitrile.

19. A compound according to claim 12 wherein the compound is 1-allyl-6,7-methylenedioxy-4(1H)-oxocinnoline-3-carbonitrile.

* * * * *